United States Patent

[11] 3,627,742

[72] Inventor Harry F. Kruse
 Terre Haute, Ind.
[21] Appl. No. 872,763
[22] Filed Oct. 30, 1969
[45] Patented Dec. 14, 1971
[73] Assignee Commercial Solvents Corporation
 New York, N.Y.

[54] ALKANOLAMINES IN VINYL CHLORIDE
 SUSPENSION POLYMERIZATION
 6 Claims, No Drawings
[52] U.S. Cl..................................................... 260/87.1,
 260/23 XA, 260/92.8 W
[51] Int. Cl..................................................... C08f 1/60,
 C08f 1/80
[50] Field of Search............................................ 260/92.8
 W, 87.1

[56] References Cited
 UNITED STATES PATENTS
3,477,999 11/1969 Takeda et al. .................. 260/78.5

Primary Examiner—Joseph L. Schofer
Assistant Examiner—Stanford M. Levin
Attorneys—Howard E. Post and Robert H. Dewey ABSTRACT: An improved process for the suspension polymerization of vinyl chloride or mixtures thereof with vinyl acetate by conducting the polymerization in the presence of from 0.2–2.0 phm of an alkanolamine corresponding to the formula

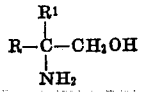

where R is hydrogen or an alkyl group of one to two carbon atoms and $R^1$ is hydrogen or a methyl radical thereby reducing fisheye formation, and improving thermal stability.

ALKANOLAMINES IN VINYL CHLORIDE SUSPENSION POLYMERIZATION

BACKGROUND OF THE INVENTION

This invention relates to an improved process for the production of vinyl polymers. In a particular aspect, this invention relates to an improved process for the suspension polymerization of vinyl chloride or mixtures thereof with vinyl acetate to produce polyvinyl chloride or copolymers of vinyl chloride and vinyl acetate in particulate form.

Polyvinyl chloride and copolymers of vinyl chloride and vinyl acetate are used in large amounts in a variety of applications. The copolymers generally contain from about 5 percent to about 15 percent by weight of vinyl acetate, usually from 10–12 percent. One widely used method for producing the polymer is to effect the polymerization of the monomer in an aqueous system at elevated temperatures and under the pressure of confinement to produce a polymer suspension. The polymer is separated, e.g. by filtration, dried and is obtained in particulate form. THe polymer particles are then used in the preparation of sheets by milling or extruding at about 300°–350° F., until the particles are fused into a sheet. If plasticized film is desired, the particles are mixed with the plasticizer before the milling or extruding step.

One of the problems encountered in utilization of vinyl polymers in the aforedescribed manner is the formation of multiple "fisheyes," a fault in transparent or translucent materials especially noticeable in films or sheets. A "fisheye" is a small globular mass formed in the polymerization process and incompletely fused with the surrounding material during milling or extrusion. These globules are generally considered to be highly cross-linked whereas the desired polymer is a straight chain. The cause of formation of fisheyes is poorly understood. Typically, a production unit will be relatively free from difficulty for long periods, then without apparent cause, fisheyes will be formed resulting in a large amount of rejected material.

Another problem frequently encountered is the tendency of the polymer to discolor due to thermal instability during the polymerization step, the drying step, and subsequent processing steps such as in milling or extruding or working the stock material. Accordingly there is an existing and longfelt need for an additive which will effectively reduce fisheye formation and improve the thermal stability of the polymer.

SUMMARY OF THE INVENTION

It is an object of this invention to provide an improved process for the production of vinyl polymers.

It is another object of this invention to provide an improved process for the suspension polymerization of vinyl chloride or mixtures thereof with vinyl acetate.

It is a third object of this invention to provide vinyl polymers and copolymers having reduced incidence of fisheye formation.

It is a fourth object of this invention to provide vinyl polymers and copolymers having improved thermal stability.

Other objectives of this invention will be apparent to those skilled in the art from the description herein.

The foregoing objectives are fulfilled by the improvement of conducting the suspension polymerization of vinyl chloride monomer (VCM) or mixtures thereof with from about 5 to about 15 percent by weight vinyl acetate monomer, at about 60° C. in the presence of 0.2–2.0 parts per hundred parts of monomer (hereinafter abbreviated to phm) of an alkanolamine corresponding to the formula:

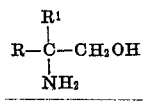

where R is hydrogen or an alkyl group of one to two carbon atoms and $R^1$ is hydrogen or a methyl radical.

DETAILED DISCUSSION

The improved process of the present invention greatly reduces the tendency of the formation of fisheyes and improves the thermal stability of the resulting polymer. According to the present invention, an alkanolamine corresponding to the above formula is added to the mixture to be polymerized in an amount of from about 0.2–2.0 phm, preferably about 0.5–1.5 phm. The polymerization is then effected at about 60° C. in a closed reaction vessel to prevent loss of monomers (and hence under elevated pressure resulting from confinement). The polymerization conditions and techniques are known to those skilled in the art.

The alkanolamines corresponding to the above formula include, but are not limited to, monoethanolamine (MEA) 2-amino-2-methyl-1-propanol (AMP) and 2-amino-1-butanol. AMP is preferred. These alkanolamines are commercially available and the usual commercial grades are suitable for the practice of this invention. AMP is also available at varying concentrations of 95–100 percent. Any of these grades is suitable provided the water content is taken into consideration in preparing the formulation.

Vinyl chloride and vinyl acetate are commercially available raw materials and the usual commercial grades are suitable for the practice of the present invention. When copolymers are prepared, vinyl acetate monomer is usually added in an amount of from about 5 to about 15 percent by weight of the vinyl chloride. Generally the preferred amount is about 10–12 percent as is known in the art.

The following recipe, which is typical of those employed in the art, was used for the examples described hereinafter and for the controls:

| Ingredient | phm |
|---|---|
| Distilled $H_2O$ | 180 |
| Suspending agent | 0.5 |
| Initiator (oil soluble) | 0.18 |
| Alkanolamine | Variable |
| Vinyl monomer | 100 |

The suspending agent used was methyl cellulose Methocel 60HG50, manufactured by Dow Chemical Co., Midland, Michigan. The initiator was lauroyl peroxide.

General Procedure for Conducting Polymerizations

For the preparation of vinyl chloride polymers, all the ingredients, except the vinyl chloride monomer (VCM) were delivered to a glass pressure-resistant reaction vessel and placed in a freezer (about −10° C.) until the contents were frozen. It was then removed from the freezer and placed on a weighing device.

Vinyl chloride monomer (liquefied by passing the vapors through a dry ice acetone trap) was added to a few grams excess and the excess slowly boiled off as the reaction vessel and contents warmed to room temperature, thereby expelling air and oxygen from the vapor space.

When the required weight was reached, the reaction vessel was then tightly closed and placed in a water bath, which was then rapidly heated to 60° C. Mixing was produced by end-over-end tumbling of the reaction vessel at 38 revolutions per minute. The polymerization reaction was continued overnight (ca. 16 hours) at the temperature of 60° C.

After the polymerization, the reaction vessel was cooled to below room temperature while still in the water bath, then removed and vented to release any excess VCM. The pH was recorded and slurry was filtered. The separated polymer was repeatedly washed with distilled water and dried in a vacuum oven (30 inches of vacuum) at 50° C. until dry (percent moisture less than 0.5 percent). They were then milled into sheets.

The results given in the examples as to thermal stability and fisheye formation tend to be variable — probably due to processing variables. However they clearly demonstrate the trends toward improved stability and reduced fisheye formation.

For the preparation of vinyl chloride-vinyl acetate copolymers, the vinyl acetate monomer is delivered to the reaction vessel along with the water and other ingredients before the freezing step. The vinyl chloride monomer is then added and the polymerization is conducted as described above.

EXAMPLE 1

Following the general polymerization procedure given above, a number of runs were made with varying concentrations of 2-amino-2-methyl-1-propanol (AMP). The data in table 1 were determined on samples polymerized in 16 oz. soft-drink, pressure-resistant bottles in the presence of 0.25 phm lauroyl peroxide initiator and 0.5 phm of methyl cellulose suspending agent. The data in table 2 were obtained on samples polymerized in 12 oz. bottles at 0.18 phm of initiator. The dry polymer particles were then mixed with plasticizers and a stabilizer as follows:

| | |
|---|---|
| Resin | 100 parts |
| Dioctyl phthalate | 40 |
| Epoxized soya oil | 5 |
| Stabilizer | 2 |

The epoxized soya oil was Emery 9332 manufactured by Emery Industries, Cincinnati, Ohio, and the stabilizer was a barium-cadmium complex, Nuodex 1237, manufactured by Nuodex Division, Tenneco Chemicals, Inc., Elizabeth, New Jersey.

The ingredients were handmixed in a beaker, milled for 5 minutes on a two-roll mill at 300° F., then formed into a sheet of approximately 35–40 mil thickness, cooled, cut in 1 inch squares and placed in a rotating shelf preheated oven set at 350° F. Chips were removed at various time intervals, examined and rated for heat stability and fisheye. Fisheye was evaluated by examining the chips for the occurrence of fisheye. They were rated as few, some, medium, medium high, and high. Heat stability was evaluated by the time (in minutes) required for a vinyl chip to completely degrade (turn totally black).

The following results were obtained:

TABLE 1

Effect of AMP on Heat Stability and Fisheye Formation

| AMP, phm | pH | Thermal Stability (minutes to black) | Fisheye Level |
|---|---|---|---|
| 0.00 | 3.4 | 135 | High |
| 0.06 | 4.2 | 120+ | High |
| 0.13 | 6.8 | 165+ | High |
| 0.50 | 9.4 | 135+ | Medium |
| 1.25 | 10.2 | 180 | Low |
| 2.5 | — | 180+ | Very few |

TABLE 2

Effect of AMP on Thermal Stability and Fisheye Formation

| AMP, phm | pH | Thermal Stability (minutes to black) | Fisheye Level |
|---|---|---|---|
| 0.50 | 9.6 | 105 | Some |
| 1.0 | 10.0 | 112 | Medium High |
| 1.25 | 10.2 | 150 | Some |
| 2.5 | 10.5 | 175 | Some |

EXAMPLE 2

The experiment of example 1 was repeated using 12-oz. bottles and 0.18 phm initiator except that monoethanolamine (MEA) was substituted or 2-amino-2-methyl-1-propanol. The results obtained are as follows:

TABLE 3

Effect of Manoethanolamine on Thermal Stability and Fisheye Formation

| MEA, phm | pH | Thermal Stability (minutes to black) | Fisheye Level |
|---|---|---|---|
| 0.0 (Control) | 3.5 | 125 | Some |
| 0.06 | 7.0 | 150 | Many |
| 0.25 | 9.8 | 165 | Many |
| 0.50 | 9.8 | 135 | Some |
| 1.00 | 10.1 | 150 | Few |
| 1.25 | — | 150 | Some |
| 2.5 | 10.4 | 165+ | Few |

EXAMPLES 3–8

The experiment of example 1 was repeated using 12-oz. bottles except that tris(hydroxymethyl)aminomethane (TA); 2-amino-2-methyl-1,3-propanediol (AMPD); triethanolamine; 2-amino-2-ethyl-1,3-propanediol (AEPD); and morpholine were substituted in varying amounts for the AMP. They were relatively ineffective in reducing fisheye formation. TA, AMPD, and AEPD slightly improved heat stability at higher concentrations.

EXAMPLE 9

The experiment of example 1 is repeated except that 2-amino-1-butanol is substituted for AMP. It is effective in reducing fisheye formation and improving stability.

EXAMPLE 10

The experiment of example 1 is repeated except that vinyl acetate monomer is substituted for 12 percent of the vinyl chloride monomer. The copolymer obtained thereby has improved thermal stability and the tendency for formation of fisheye during polymerization is reduced.

I claim:

1. In a process of the aqueous suspension polymerization of vinyl chloride or a mixture thereof with from 5 to about 15 percent by weight of vinyl acetate in the presence of a suspending agent and an initiator to produce a polyvinyl chloride or a copolymer of vinyl chloride and acetate respectively, the improvement consisting of effecting said polymerization at a temperature of about 60° C. in the presence of from 0.2 to 2.0 phm of an alkanolamine corresponding to the formula

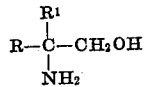

where R is hydrogen or an alkyl group of one to two carbon atoms and $R^1$ is hydrogen or a methyl radical.

2. The process of claim 1 wherein said alkanolamine is 2-amino-2-methyl-1-propanol.

3. The process of claim 1 wherein said alkanolamine is 2-amino-1butanol.

4. The process of claim 1 wherein said alkanolamine is monoethanolamine.

5. The process of claim 1 wherein vinyl chloride is polymerized to produce polyvinyl chloride.

6. The process of claim 1 wherein vinyl chloride is copolymerized with from 5 to about 15 percent by weight of vinyl acetate to produce a vinyl chloride-vinyl acetate copolymer.

PO-1050
(5/69)

UNITED STATES PATENT OFFICE
CERTIFICATE OF CORRECTION

Patent No. 3,627,742                    Dated December 14, 1971

Inventor(s) Harry F. Kruse

It is certified that error appears in the above-identified patent and that said Letters Patent are hereby corrected as shown below:

Table 3, Column 4, line 7, in the title "Manoethanolamine" should be --Monoethanolamine--.

Claim 1, Column 4, line 47, "of", 1st occurence, should be --for--.

Claim 1, Column 4, line 51, "acetate" should be --vinyl acetate--.

Claim 3, Column 4, line 67, "2-amino-1 butanol" should be --2-amino-1-butanol--.

Signed and sealed this 27th day of June 1972.

(SEAL)
Attest:

EDWARD M. FLETCHER, JR.          ROBERT GOTTSCHALK
Attesting Officer                 Commissioner of Patents